US007080784B2

(12) United States Patent
O'Keeffe et al.

(10) Patent No.: US 7,080,784 B2
(45) Date of Patent: Jul. 25, 2006

(54) VISUAL DISPLAY DEVICE AND A METHOD FOR OPERATING A VISUAL DISPLAY PANEL

(75) Inventors: Donal O'Keeffe, Clare (IE); Albert O'Halloran, Clare (IE)

(73) Assignee: Vlyte Innovations Limited, Limerick (IR)

( * ) Notice: Subject to any disclaimer, the term of this patent is extended or adjusted under 35 U.S.C. 154(b) by 154 days.

(21) Appl. No.: 10/487,921

(22) PCT Filed: Aug. 27, 2002

(86) PCT No.: PCT/IE02/00124

§ 371 (c)(1),
(2), (4) Date: Feb. 27, 2004

(87) PCT Pub. No.: WO03/019514

PCT Pub. Date: Mar. 6, 2003

(65) Prior Publication Data

US 2004/0232240 A1 Nov. 25, 2004

(30) Foreign Application Priority Data

Aug. 27, 2001 (IE) ............................... S2001/0791

(51) Int. Cl.
*G06K 7/14* (2006.01)

(52) U.S. Cl. ...................................................... 235/454

(58) Field of Classification Search ................. 235/454
See application file for complete search history.

(56) References Cited

U.S. PATENT DOCUMENTS

| | | | | |
|---|---|---|---|---|
| 5,592,193 | A | 1/1997 | Chen | |
| 6,175,353 | B1 | 1/2001 | Hoeksma | |
| 6,556,515 | B1 * | 4/2003 | Sekiguchi | 368/242 |

FOREIGN PATENT DOCUMENTS

| | | | |
|---|---|---|---|
| JP | 11 184442 | A | 7/1999 |
| JP | 2002 091385 | A | 3/2002 |

* cited by examiner

*Primary Examiner*—Karl D. Frech
*Assistant Examiner*—Jamara A. Franklin
(74) *Attorney, Agent, or Firm*—Sughrue Mion, PLLC

(57) ABSTRACT

A visual display device (1) comprises a visual display panel (5) which comprises an electro-optical medium (17) provided by a cholesteric liquid crystal medium which defines a plurality of pixels (20) which are alternately and selectively operable in a first light transmitting mode for forming a background (40) and a second light scattering mode for forming a character (39) against the background (40). A video projector (35) projects a light beam (37) at a rear major face (34) of the visual display panel (5) which defines an image (38) of a character (39) being displayed on the visual display panel (5). The light in the light beam (37) is incident on the pixels (20) which are operating in the second light scattering mode for forming the character (39) thereby increasing the brightness of the pixels (20) operating in the light scattering mode when viewed by a subject (33), and thus enhancing the contrast between the pixels (20) operating in the second light scattering mode which form the character (39), and the remaining pixels (20) which form a background (40) of the visual display panel (5).

22 Claims, 5 Drawing Sheets

VISUAL DISPLAY DEVICE AND A METHOD FOR OPERATING A VISUAL DISPLAY PANEL

This is a National Stage entry of PCT Application No. PCT/IE02/00124 filed Aug. 27, 2002; the disclosure of which is incorporated herein by reference.

BACKGROUND OF THE INVENTION

The present invention relates to a method for operating a visual display panel, and in particular, for operating a visual display panel for displaying a character. The invention also relates to a visual display device for displaying one or more characters. Further the invention relates to a shop window comprising the visual display device.

Visual display devices for displaying characters, for example, letters, numerals and the like for presenting information are well known. Such visual display devices typically comprise a visual display panel which is formed by an electro-optical medium sandwiched between a pair of transparent substrates. Typically, one of the substrates carries a plurality of row electrodes, while the other substrate carries a plurality of column electrodes. The row and column electrodes are individually addressable and co-operate with each other and with the electro-optical medium for defining a plurality of pixels in the electro-optical medium. The pixels defined in the electro-optical medium by the respective row and column electrodes are arranged in a matrix having a plurality of rows and columns. By selectively addressing the electrodes, each of the pixels are individually and selectively addressable for selectively forming characters for in turn forming the information to be displayed on the visual display panel. Various electro-optical media may be used in such panels, however, a commonly used electro-optical medium is a cholesteric liquid crystal medium. The pixels defined in such a cholesteric liquid crystal medium are operable in a light transmitting mode when a voltage is developed across the pixel by the corresponding respective row and column electrodes, and is operable in a light scattering mode when the voltage across the pixels is reduced to zero. Pixels operating in the light transmitting mode allow light incident on those pixels to be transmitted through the pixels. Pixels which are operating in the light scattering mode allow light incident on those pixels to be transmitted through the pixels, but the light being transmitted through the panel is predominantly scattered. This will be well known and understood by those skilled in the art.

One problem encountered in the use of such panels for displaying characters, for example, for presenting information is that the contrast between those pixels operating in the light transmitting mode, and those pixels operating in the light scattering mode in certain operating environments may be such that difficulty may be encountered in distinguishing characters displayed from the background against which the characters are displayed. For example, when the panel is displaying characters, such as information or the like in relatively bright ambient light, and in particular, in sunlight where the sunlight is incident on the side of the panel from which the information is being viewed, the contrast between the pixels operating in the light transmitting mode and those operating in the light scattering mode may be insufficient to permit the information displayed on the panel to be easily deciphered.

There is therefore a need for a method for improving the contrast between those pixels operating in the light transmitting mode and those pixels operating in the light scattering mode in a visual display panel which comprises a plurality of pixels which are alternately and selectively operable in a light transmitting mode and in a light scattering mode. There is also a need for a visual display device comprising a visual display panel which comprises a plurality of pixels which are alternately and selectively operable in a light transmitting mode and in a light scattering mode in which the contrast between those pixels which are operating in the light transmitting mode and those which are operating in the light scattering mode is enhanced. There is also a need for a shop window comprising such a visual display device.

The present invention is directed towards providing such a method, a visual display device and a shop window.

SUMMARY OF THE INVENTION

According to the invention there is provided a method for operating a visual display panel for displaying a character, the visual display panel being of the type comprising a plurality of individually addressable pixels, the pixels being alternately and selectively operable in a first light transmitting mode and in a second light scattering mode, wherein the pixels are alternately and selectively operable in one of the first light transmitting mode and the second light scattering mode for forming a background, and in the other of the first light transmitting mode and the second light scattering mode for defining the character against the background, the visual display panel having a front major face from which the character is viewable, and an opposite rear major face, the method comprising projecting light onto the rear major face of the panel from the rear thereof, so that the projected light only falls on the pixels which are being operated in one of the first light transmitting mode and the second light scattering mode for enhancing the contrast between the pixels operating in the respective first light transmitting mode and the second light scattering mode.

In one embodiment of the invention the light is projected onto the pixels which are being operated in the second light scattering mode so that the projected light is scattered towards the subject.

In another embodiment of the invention the pixels are operated in the first light transmitting mode for forming the background.

In a further embodiment of the invention the projected light is projected in the form of a light beam. Preferably, the light beam defines an image of the character. Advantageously, the light beam is projected so that the image of the character defined by the light beam when projected onto the rear major face of the panel is aligned with the character displayed on the panel.

In one embodiment of the invention the light beam is projected from a video projector. Preferably, the light beam being projected by the video projector is synchronised with the visual display panel. Advantageously, the light beam is derived from at least one of a plurality of selectable colours.

In one embodiment of the invention at least some of the selectable colours are simultaneously selectable. Alternatively, at least some of the selectable colours are sequentially selectable.

In one embodiment of the invention the light is projected onto the rear major face of the panel along an axis contained in at least one of an X plane and a Y plane perpendicular to each other, the respective X and Y planes extending perpendicularly from the rear major face of the panel.

In another embodiment of the invention the axis along which the light is projected onto the rear major face of the panel extends at an angle in the range of 50° to 80° to the rear major face of the panel in the one of the X and Y planes within which the axis is contained. Preferably, the axis along which the light is projected onto the rear major face of the panel extends at an angle in the range of 59° to 69° to the rear major face of the panel in the one of the X and Y planes within which the axis is contained. Advantageously, the axis along which the light is projected onto the rear major face of the panel extends at an angle of 64° approximately to the rear major face of the panel in the one of the X and Y planes within which the axis is contained.

In another embodiment of the invention the axis along which light is projected onto the rear major face of the visual display panel is contained in both the X plane and the Y plane.

In one embodiment of the invention the pixels are selectively operable in a third light scattering mode in which only a proportion of light incident on each pixel operating in the third light scattering mode is passed through the pixel and scattered therefrom, the remainder of the light incident on the pixel being reflected. Advantageously, when each pixel is operated in the third light scattering mode, some of the ambient light incident on the pixel on the front face thereof is reflected from the front face of the pixel, so that a subject viewing the panel from the front face thereof is presented with both scattered projected light which has been passed through the pixel operating in the third light scattering mode, and ambient light reflected from the front face of the pixel operating in the third light scattering mode.

In one embodiment of the invention the proportion of light scattered by each pixel operating in the third light scattering mode lies in the range of 20% to 80% of the incident light, and the proportion of light reflected from each pixel operating in the third light scattering mode lies in the range of 20% to 80% of the incident light thereon.

In another embodiment of the invention the pixels are selectively operable in an intermediate grey scale mode whereby some of the light incident on each pixel operating in the grey scale mode is transmitted through the pixel unscattered and some of the light incident on the pixel is transmitted through the pixel but is scattered.

In a further embodiment of the invention some of the background is formed by pixels operating in the grey scale mode.

In a further embodiment of the invention the light projected onto the rear major face defines an additional image. Preferably, the additional image defined by the projected light is projected onto the pixels which are being operated for forming the background.

In one embodiment of the invention the additional image is selectively alterable.

In another embodiment of the invention the additional image is a static image.

In a further embodiment of the invention at least part of the additional image comprises an animated character.

In a still further embodiment of the invention the additional image may be partly static and partly animated.

In one embodiment of the invention the additional image includes letters for forming information to be displayed in the additional image.

In another embodiment of the invention the additional image contains numerals for forming information to be displayed in the additional image.

In a further embodiment of the invention the additional image comprises a combination of letters and numerals for forming information to be displayed in the additional image.

In a still further embodiment of the invention the additional image includes characters which are selectable from any one or more of the following:

people,
places,
cartoon characters, and
articles.

In one embodiment of the invention the displayed characters are selectively alterable.

In another embodiment of the invention at least some of the characters displayed on the visual display panel are static characters.

In a further embodiment of the invention at least some of the characters displayed on the visual display panel are animated characters.

In a still further embodiment of the invention the characters displayed on the visual display panel are static characters and animated characters.

In one embodiment of the invention some of the characters displayed on the visual display panel are letters for forming information to be displayed on the panel.

In another embodiment of the invention some of the characters displayed on the visual display panel are numerals for forming information to be displayed on the panel.

In a further embodiment of the invention some of the characters displayed on the visual display panel are a combination of letters and numerals for forming information to be displayed on the panel.

In a still further embodiment of the invention some of the characters displayed on the visual display panel may be an image selected from one or more of the following:

people,
places,
cartoon characters, and
articles.

Additionally, the invention provides a visual display device for displaying a character, the visual display device comprising a visual display panel of the type comprising a plurality of individually addressable pixels, the pixels being alternately and selectively operable in a first light transmitting mode and in a second light scattering mode, wherein the pixels are alternately and selectively operable in one of the first light transmitting mode and in the second light scattering mode for forming a background, and in the other of the first light transmitting mode and the second light scattering mode for defining the character against the background, the panel having a front major face from which the character is viewable, and an opposite rear major face, and a light projecting means is provided for projecting light onto the rear major face of the panel from the rear thereof, the light projecting means projecting the light so that light only falls on the pixels which are being operated in one of the first light transmitting mode and the second light scattering mode for enhancing the contrast between the pixels operating in the respective first light transmitting mode and the second light scattering mode.

In one embodiment of the invention the light projecting means is mounted relative to the visual display panel so that the image of the character defined by the light beam is aligned with the character displayed on the visual display panel.

In another embodiment of the invention the light projecting means is a video projector. Preferably, the light projecting means projects light derived from at least one of a plurality of selectable colours.

In one embodiment of the invention the light projecting means is synchronised with the visual display panel.

In another embodiment of the invention a control means is provided for controlling the operation of the visual display panel and the light projecting means.

In one embodiment of the invention the light projecting means is mounted relative to the visual display panel so that the light projected onto the rear major face of the panel is projected along an axis which is contained in at least one of an X plane and a Y plane perpendicular to each other, the respective X and Y planes extending perpendicularly from the rear major face of the visual display panel.

In another embodiment of the invention the light projecting means is mounted relative to the visual display panel so that the axis along which the light is projected in the one of the X plane and the Y plane which contains the axis is at an angle to the rear major face of the visual display panel which lies in the range of 50° to 80°. Preferably, the light projecting means is mounted relative to the visual display panel so that the axis along which the light is projected in the one of the X plane and the Y plane which contains the axis is at an angle to the rear major face of the visual display panel which lies in the range of 59° to 69°. Advantageously, the light projecting means is mounted relative to the visual display panel so that the axis along which the light is projected in the one of the X plane and the Y plane which contains the axis is at an angle to the rear major face of the visual display panel of 64° approximately.

In another embodiment of the invention the light projecting means is mounted relative to the visual display panel so that the axis along which the light is projected onto the rear major face of the visual display panel is contained in the X plane and the Y plane.

In one embodiment of the invention the pixels are arranged in a plurality of rows and columns to form a matrix.

In another embodiment of the invention the visual display panel comprises a front substrate panel and a rear substrate panel defining the front and rear major faces, respectively, of the visual display panel, and an electro-optical medium sandwiched between the respective front and rear substrate panels.

In a further embodiment of the invention the electro-optical medium is a cholesteric liquid crystal medium.

Preferably, one of the front and rear substrate panels is patterned with a plurality of electrically conductive column electrodes, and the other of the front and rear substrate panels is patterned with a plurality of row electrodes for co-operating with the column electrodes for defining the respective pixels. Advantageously, the respective row and column electrodes are addressable by the control means for selectively addressing the corresponding pixels for operating the pixels in a selected one of the selectable modes.

In one embodiment of the invention the visual display panel is adapted for mounting in a shop window. Advantageously, the visual display panel is adapted for mounting in a shop window with the visual display panel laminated thereto. Preferably, the visual display panel is adapted for mounting in a shop window with a part of the window of the shop window being formed by the visual display panel.

Additionally the invention provides a shop window comprising a window pane, and the visual display device according to the invention mounted adjacent the window pane.

Further the invention provides a shop window comprising a window pane, and the visual display device according to the invention laminated to the window pane.

The invention also provides a shop window comprising a window pane, and the visual display device according to the invention forming a part of the window pane.

The advantages of the invention are many. By virtue of the fact that the contrast between the pixels operating in the first light transmitting mode, and the pixels operating in the second light scattering mode is enhanced, characters displayed on the visual display panel are more readily decipherable, and in particular, are more readily decipherable in bright ambient light, for example, sunlight, and in particular, where the sunlight is incident on the panel. A further advantage of the invention is achieved when the light projecting means selectively projects light of different colours either simultaneously or sequentially, in that the visual display panel can be operated to display characters in one or a number of different colours. Where the light projecting means projects light of different colours simultaneously, the visual display panel can display multicolour displays. The contrast between the characters and the background against which they are displayed is further enhanced when one or other of the characters or background appear in colour. A further advantage of the invention is achieved when the visual display panel is of the type in which the pixels are operable in a third light scattering mode, since this permits the visual display panel to display characters on different backgrounds, namely, a first background formed by pixels operating in one of the first light transmitting mode and the second light scattering mode, and a second background, typically, an intermediate background being formed by the pixels operating in the third light scattering mode. A further advantage of the invention is achieved when the visual display panel is of the type in which the pixels may also be selectively operable in a grey scale mode. This permits a further alternative background to be provided by operating some of the pixels in the grey scale mode.

By enhancing the contrast between the pixels which are operating in the first light transmitting mode, and the pixels which are operating in the second light scattering mode, contrast between the character or characters being displayed and the background against which the characters are being displayed is improved. The background may be formed by the pixels which are operating in either the first light transmitting mode or the second light scattering mode, and the character would be formed by operating the pixels in the other of the two modes. However, typically, and in general, it is preferable that the background is formed by operating the relevant pixels in the first light transmitting mode, and the characters are displayed against the background by operating the pixels which are to define the characters in the second light scattering mode. It has been found that optimum results are achieved when the light projecting means projects light at the pixels which are operating in the second light scattering mode, since the additional light provided by the projected light incident on the pixels operating in the second light scattering mode causes the pixels operating in the second light scattering mode to appear particularly bright relative to the pixels which are operating in the first light transmitting mode. This is particularly so when the projected light from the light projecting means is only incident on those pixels which are operating in the second light scattering mode, and no projected light is incident on the pixels which are operating in the first light transmitting mode.

A further advantage of the invention is achieved when the projecting means is operable for projecting an additional image of a character, and a particularly advantageous form of the visual display panel is provided when the additional image is projected onto the pixels which are forming the background. In this case the additional image appears brighter than the pixels which are forming the background and which are not subjected to light from the light projecting means. Where the background is being formed by pixels operating in the first light transmitting mode or in the grey scale mode, a particularly advantageous form of the panel is provided. The projected light of the additional image incident on the pixels which are operating in the first light transmitting mode or in the grey scale mode cause these pixels to appear brighter than the pixels operating in the first light transmitting mode or in the grey scale mode on which no additional light of the additional image is incident, while at the same time the pixels which are operating in the second light scattering mode and on which the projected light is incident appear brighter again than those pixels which are operating in the first light transmitting mode or the grey scale mode, and on which projected light of the additional image is incident. This advantage is particularly evident when the additional image is projected onto pixels operating in the grey scale mode to form the background or a part of the background.

BRIEF DESCRIPTION OF THE DRAWINGS

The invention will be more clearly understood from the following description of some preferred embodiments thereof, which are given by way of example only, with reference to the accompanying drawings, in which.

DETAILED DESCRIPTION OF THE INVENTION

Figure 1:
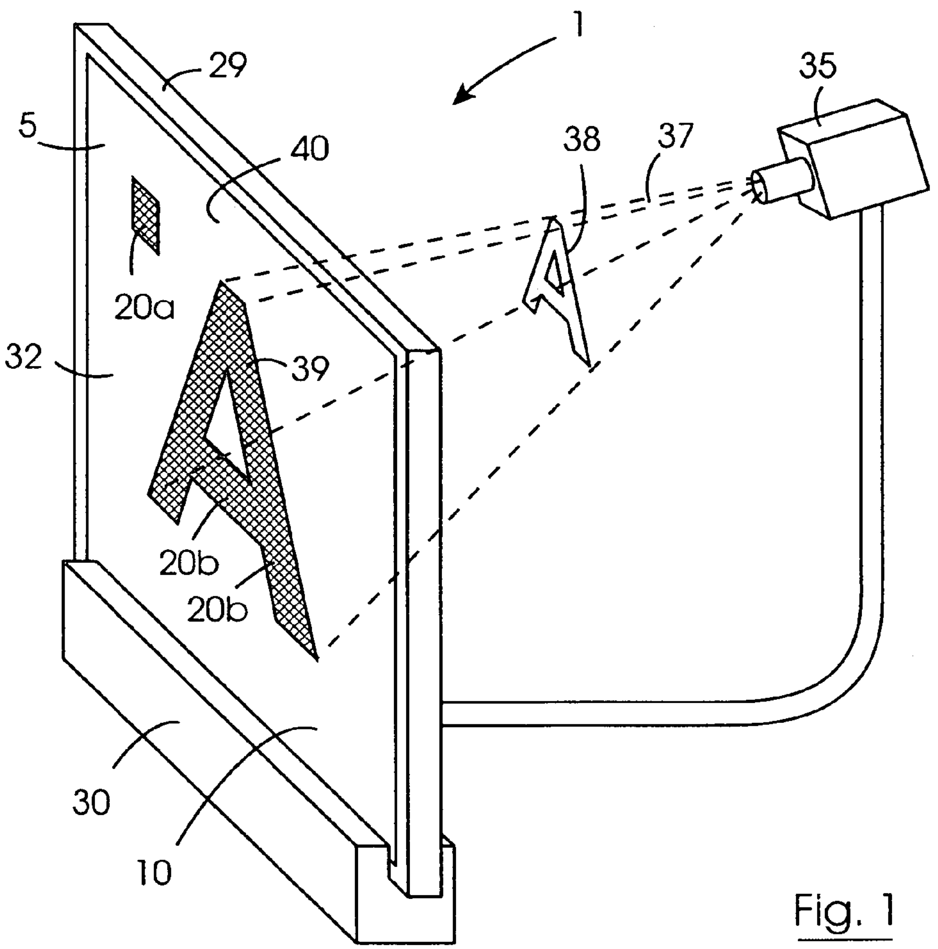
FIG. 1 is a perspective view of a visual display device according to the invention.

Referring to the drawings and initially to FIGS. 1 to 9 there is illustrated a visual display device according to the invention indicated generally by the reference numeral 1 for displaying a character or characters, which in this embodiment of the invention are letters, numerals and images for forming information to be displayed. The information may be static or animated, and may be data or a graphical display.

Figure 8:
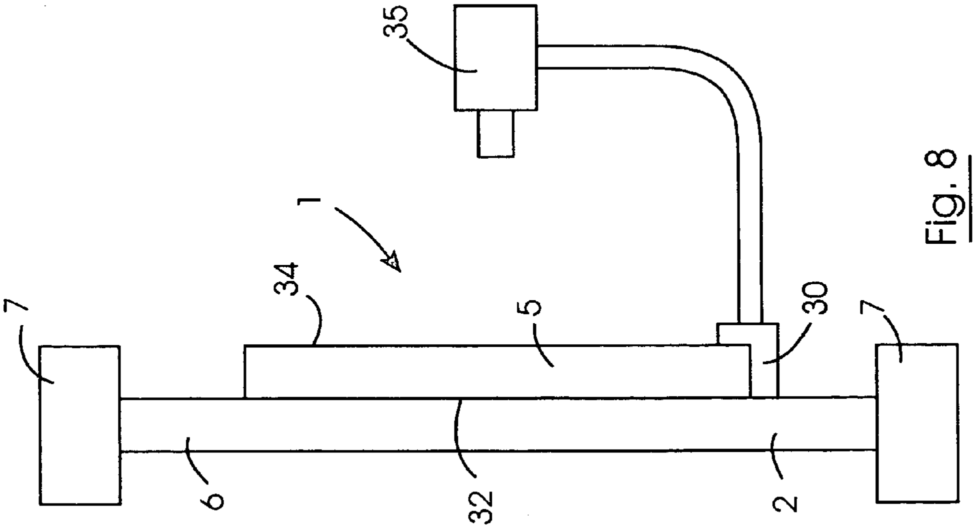
FIG. 8 is a transverse cross-sectional side elevational view of a shop window incorporating the visual display device of FIG. 1.

The visual display device 1 is particularly suitable for locating in a shop window 2 as illustrated in FIG. 8 for displaying data and other information, for example, price data and the like. The visual display device 1 comprises a visual display panel 5 which is suitable for mounting on or adjacent the shop window 2, and in FIG. 8 is illustrated laminated to a window pane 6 which is set in a window frame 7 of the shop window 2. Indeed, the visual display panel 5 may form all or part of the window pane 6 of a shop window, and when the visual display panel 5 forms all of the window pane 6, it is envisaged that the visual display panel 5 would be mounted in a window frame of the shop window, and would replace the window pane. Needless to say, the visual display device 1 may be provided as a stand-alone unit, and may be provided for placing within a shop window, or within a shop, or within a foyer of a hotel, cinema, theatre, restaurant or the like, or indeed, in any other suitable location either indoor or outdoor.

Figure 4:
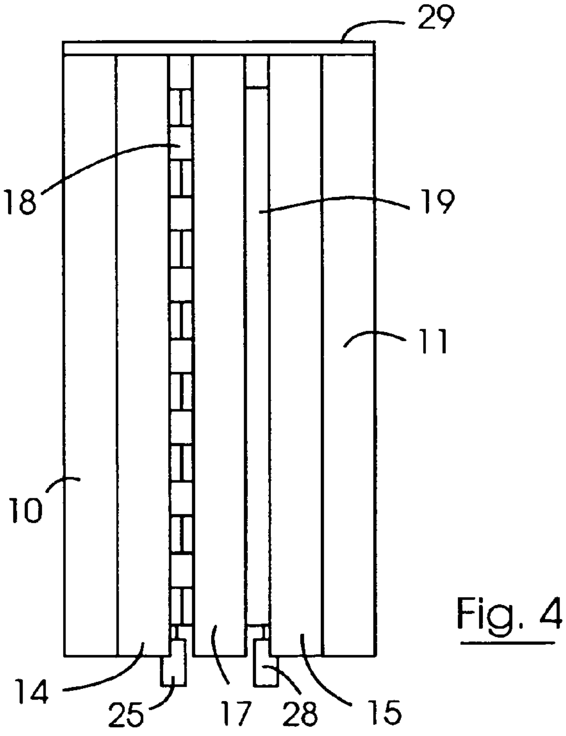
FIG. 4 is a transverse cross-sectional side elevational view on the line III—III of FIG. 2 of a portion of the visual display device of FIG. 1 showing details of the portion of the visual display device not illustrated in FIG. 3.
Figure 5:
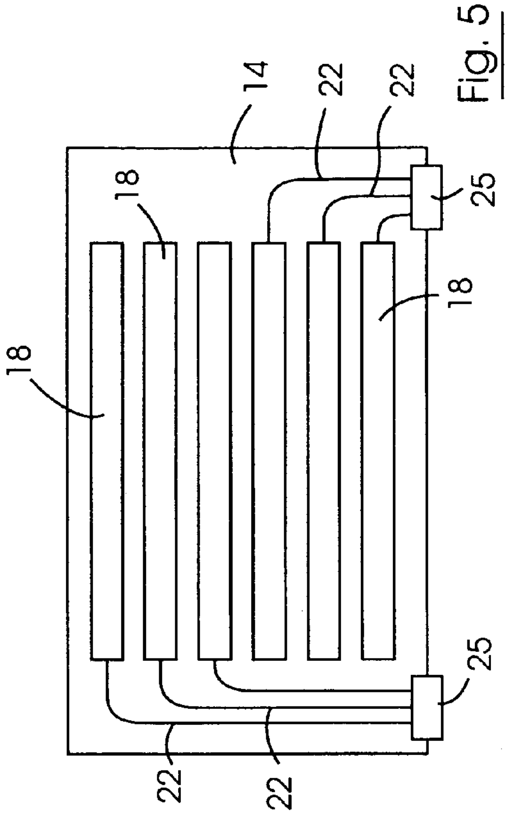
FIG. 5 is an elevational view of a portion of the visual display device of FIG. 1.
Figure 6:
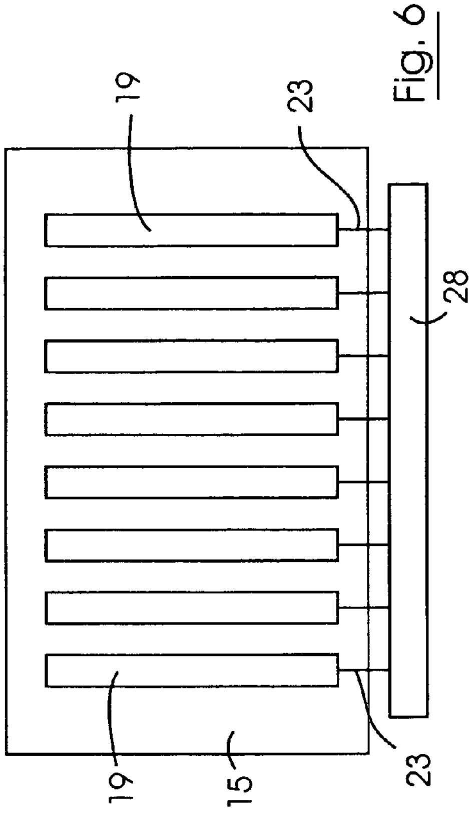
FIG. 6 is an elevational view of another portion of the visual display device of FIG. 1.

Referring in particular to FIGS. 4 to 6, the visual display panel 5 comprises a front protective panel 10 and a rear protective panel 11 both of transparent polycarbonate plastics material. Located between the front and rear protective panels 10 and 11 are front and rear substrates 14 and 15, respectively, between which an electro-optical medium 17 is located. The front and rear substrates 14 and 15 are both of transparent PET plastics material. In this embodiment of the invention the electro-optical medium is a cholesteric liquid crystal medium. The front and rear substrates 14 and 15 are coated with transparent idium tin oxide, which is patterned to form a plurality of row electrodes 18 and column electrodes 19 for defining a plurality of individually addressable pixels 20 which are arranged in a matrix of rows and columns, and are addressable through the row and column electrodes 18 and 19. The row electrodes 18 are formed on the front substrate 14, while the column electrodes 19 are formed on the rear substrate 15. Electrically conductive tracks 22 and 23 are also patterned in the transparent idium tin oxide on the front substrate 14 and the rear substrate 15, respectively, and extend from the electrodes 18 and 19 for facilitating addressing of the row and column electrodes 18 and 19, respectively.

Connector terminals 25 located at the bottom edge of the front substrate 14 facilitate connection of the row electrodes 18 through the tracks 22 to a control means provided by a control circuit 26, which is described in detail below with reference to FIG. 7, for addressing the row electrodes 18. A connector terminal 28 extending along the bottom edge of the rear substrate 15 facilitates connection of the column electrodes 19 to the control circuit 26 through the tracks 23.

The front and rear substrates 14 and 15 are bonded to the front and rear protective panels 10 and 11, respectively, by a suitable optical adhesive. A circumferential sealing member 29 extending around the visual display panel 5 secures the front and rear protective panels 10 and 11 and the front and rear substrates 14 and 15 together, and also retains the electro-optical medium 17 in tight abutting engagement between the front and rear substrates 14 and 15. A housing 30 extends along the lower end of the visual display panel 5 for housing the control circuit 26 and for housing electrical cables (not shown) for connecting the connector terminals 25 and 28 to the control circuit 26. The construction of such visual display panels 5 will be well known to those skilled in the art.

The pixels 20 are individually and selectively addressable through the row and column electrodes 18 and 19, and since the electro-optical medium 17 is a cholesteric liquid crystal medium, the pixels 20 are alternately and selectively operable in a first light transmitting mode whereby light incident on one side of the pixels 20 is transmitted through the pixels 20, and in a second light scattering mode in which light incident on one side of the pixels 20 is transmitted through the pixels 20 but is scattered as it is being transmitted through the pixels 20. The pixels 20 are also operable in an intermediate grey scale mode in which a proportion of the light incident on one side of the pixels 20 is transmitted through the pixels 20 in an unscattered state, and a proportion of the light incident on that side of the pixels 20 is transmitted through the pixels in a scattered state. In other words, when a pixel is being operated in the intermediate grey scale mode, some of the light incident on the pixel is transmitted through the pixel unscattered, while the remainder of the light is transmitted through the pixel in a scattered state.

The pixels 20 are operated in the first light transmitting mode by applying a maximum voltage across the pixels by the electrodes 18 and 19, and the pixels 20 are operated in the second light scattering mode by reducing the voltage across the pixels 20 to zero. To operate the pixels in the grey scale mode a voltage is applied across the pixels of value intermediate the maximum value and zero volts. The proportion of light transmitted unscattered through the pixels operating in the grey scale mode to the proportion of light transmitted through the pixels in the scattered state is a function of the voltage applied across the pixels, the lower the voltage, the greater the proportion of light which will be transmitted through the pixels in the scattered state. The cone angle of light transmitted through each pixel operating in the grey scale mode increases as the proportion of light being transmitted through the pixels in the scattered state increases. Thus, the higher the proportion of light which is being scattered through the pixels, the greater will be the cone angle of the light exiting the pixels.

Figure 2:
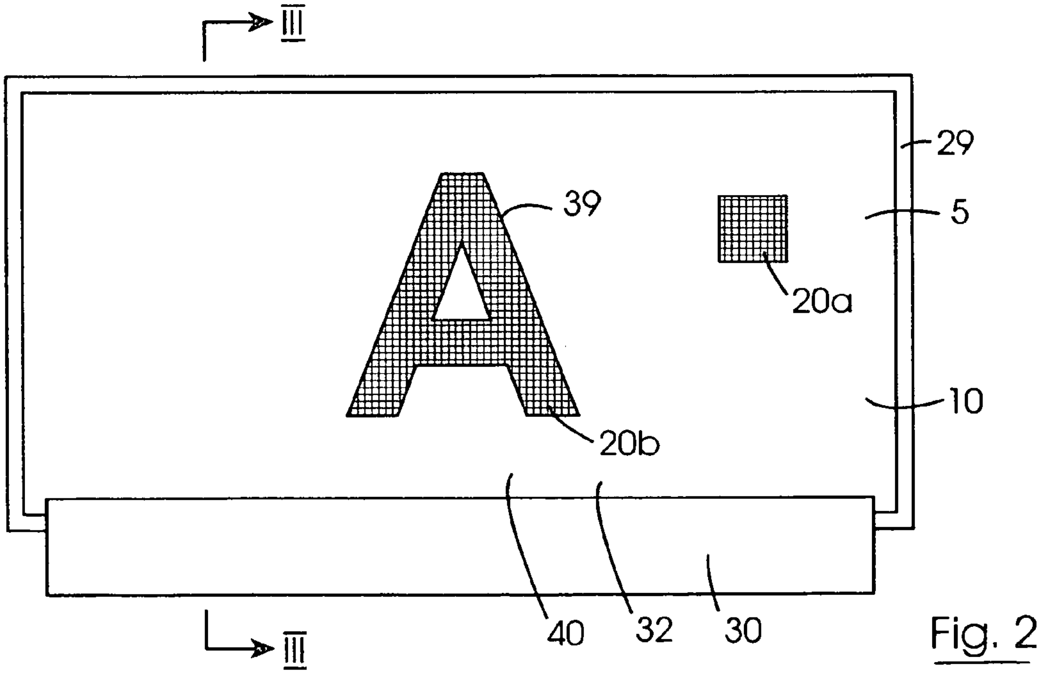
FIG. 2 is a front elevational view of the visual display device of FIG. 1.
Figure 3:
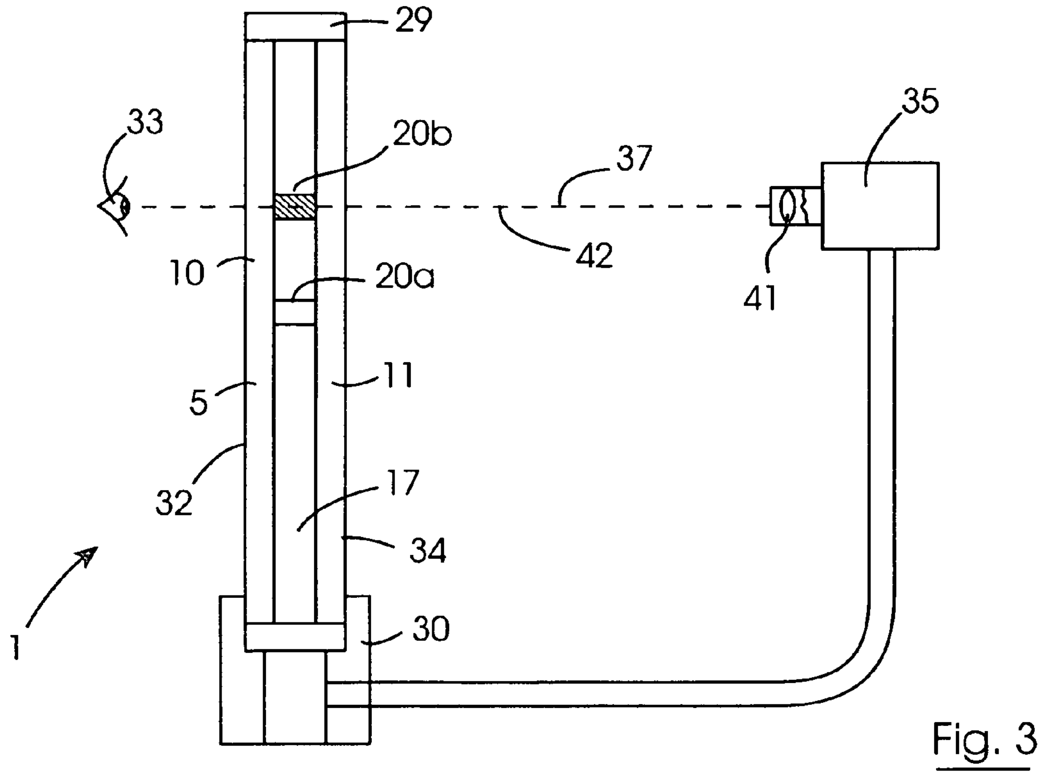
FIG. 3 is a diagrammatic transverse cross-sectional side elevational view of the visual display device of FIG. 1 on the line III—III of FIG. 2.

In this embodiment of the invention the pixels 20 are operated in the first light transmitting mode for forming a background against which the characters are to be displayed, and the pixels 20 are operated in the second light scattering mode for forming the characters to be displayed against the background formed by the pixels 20 operating in the first light transmitting mode. In FIGS. 1 to 3 the pixels 20*a* are illustrated operating in the light transmitting mode, while the pixels 20*b* are illustrated operating in the second light scattering mode.

The front protective panel 10 defines a front major face 32 from which a subject 33 views the visual display panel 5. The rear protective panel 11 defines a rear major face 34 onto which light is projected from a light projecting means, namely, a colour image video projector 35 for enhancing the contrast between the pixels 20*b* which are operated in the second light scattering mode, and the pixels 20*a* which are operating in the first light transmitting mode. The video projector 35 is operated under the control of the control circuit 26, and projects a light beam 37 at the rear major face 34 which defines an image 38 of a character 39 being formed on the visual display panel 5, see FIGS. 1 and 3. The video projector 35 is mounted relative to the visual display panel 5 so that the light beam 37 being projected by the video projector 35 is aligned with the visual display panel 5, and the image 38 of the character 39 displayed on the visual display panel 5 is aligned with the character 35.

The light in the light beam 37 actually forms the image 38 of the character 39. Thus, the pixels 20*b*, which are being operated in the second light scattering mode to define the character 39, also receive projected light in the light beam 37 defining the image 38, thus increasing the light incident on the rear face of the pixels 20*b* which are operating in the second light scattering mode. In turn the contrast between the pixels 20*b* operating in the second light scattering mode forming the character 39 and the pixels 20*a* operating in the first light transmitting mode forming the background to the character 39 is significantly enhanced. The background is indicated in the visual display panel 5 by the reference numeral 40. An object lens 41 in the video projector 35 focuses the image 38 defined by the light beam 37 so that when the video projector 35 and the visual display panel 5 are accurately aligned with each other, the image 38 defined by the light beam 37 is accurately focused and aligned with the character 39 on the rear major face 34 of the visual display panel 5.

For ease of illustration and to facilitate an understanding of the invention, the character 39 which is displayed on the visual display panel 5 is a large letter "A". The pixels 20 which are required to define the letter "A" on the visual display panel 5 are operated in the second light scattering mode, namely, the pixels 20*b*. The remaining pixels, namely, the pixels 20*a* are operated in the first light transmitting mode to form the background 40. The video projector 35 is controlled by the control circuit 26 to project the light beam 37 so that the light in the light beam 37 is shaped in cross-section to define the image of the letter "A". The light in the light beam 37 is focused, and the video projector 35 is aligned so that the focused light in the light beam 37 forming the letter "A" is incident on the rear face of the pixels 20*b* which are operating in the second light scattering mode, and only on the pixels 20*b* operating in the second light scattering mode. No light from the video projector 35 is incident on the pixels 20*a* which are operating in the first light transmitting mode to form the background 40.

The video projector 35 may be free mounted relative to the visual display panel 5, however, it is essential that both the visual display panel 5 and the video projector 35 should be aligned with each other, and the video projector 35 should be focused so that the focused light beam is incident on the pixels 20*b* which are being operated in the light scattering mode. In certain circumstances, free mounting of the video projector 35 relative to the visual display panel 5 may not provide the required degree of alignment and focusing of the video projector 35 relative to the visual display panel 5, and in which case, the video projector 35 will be connected to the visual display panel by a suitable mounting bracket. Such a mounting bracket may be provided extending from the housing 30 of the visual display panel 5. Alternatively, it is envisaged that the visual display panel 5 and the video projector 35 may be mounted in a framework or a housing so that both can be retained in accurate alignment with each other, and the video projector 35 can be accurately focused on the visual display panel 5.

In this embodiment of the invention the video projector 35 is mounted relative to the visual display panel 5 so that a central axis 42 of the light beam 37, see FIG. 3, projected by the video projector 35 is contained in an X plane and a Y plane which are perpendicular to each other, and which extend perpendicularly from the rear major face 34 of the visual display panel 5. In other words, the central axis 42 of the light beam 37 projected from the video projector 35 lies in a horizontal and a vertical plane extending from the visual display panel 5 when the visual display panel 5 is vertically mounted. By projecting the light beam 37 from the video projector 35 onto the visual display panel 5 along the central axis 42 which is contained in both the X plane and the Y plane the light passing through the pixels 20*b* which are being operated in the second light scattering mode for forming the character 39, the scattered light from the pixels 20*b* operating in the second light scattering mode is in the field of view of a subject 33 when the subject is viewing the panel from the front major face 32 thereof, see FIG. 3.

Figure 7:
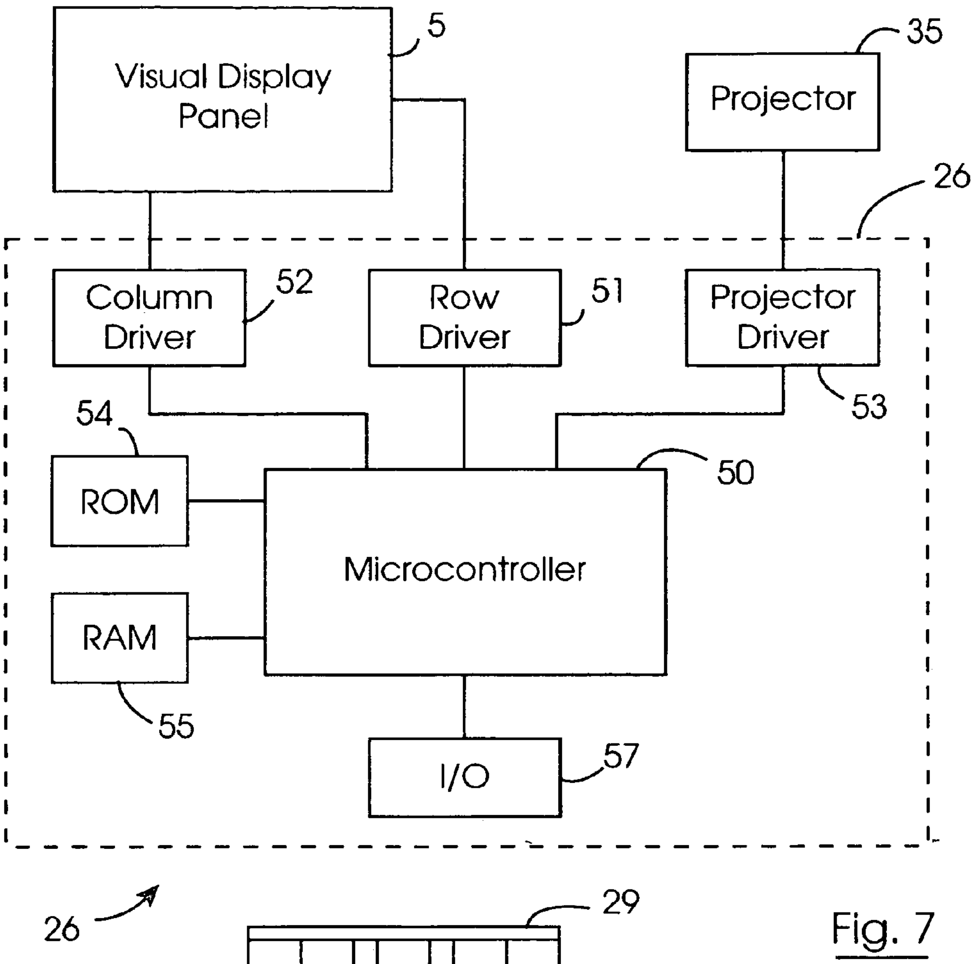
FIG. 7 is a block representation of a circuit of the visual display device of FIG. 1.

Referring now to FIG. 7, the control circuit 26 will now be described. The control circuit 26 comprises a microcontroller 50 which controls the operation of the control circuit 26 and the visual display panel 5 and the video projector 35. A driver circuit 51 operating under the control of the microcontroller 50 powers the row electrodes 18, and a driver circuit 52 also operating under the control of the microcontroller 50 powers the column electrodes 19. The microcontroller 50 operates the video projector 35 through a driver circuit 53. A read only memory 54 stores computer software under which the microcontroller 50 is operated for controlling the control circuit 26, the visual display panel 5 and the video projector 35. A random access memory 55 stores frames of characters, typically data to be sequentially displayed on the visual display panel 5. An I/O port 57 facilitates inputting and outputting of data to and from the microcontroller 50, and in particular, for inputting new frames of data to be stored in the random access memory 55 to be displayed on the visual display panel 5.

In use, with the visual display panel 5 mounted on the window pane 6 of the shop window 2, and the video projector 35 aligned with the visual display panel 5 and focused thereon, and with the appropriate computer software stored in the ROM 54, frames of data to be displayed on the visual display panel 5 are inputted through the I/O port 57 and stored in the RAM 55. The sequence in which the frames of data are to be displayed and the duration for which each frame of data is to be displayed is also inputted through the I/O port 57 and stored in the RAM 55. At this stage the visual display device 1 is ready for use, and under the control of the computer software stored in the ROM 54 the microcontroller 50 selects the frames of data in the appropriate sequence and operates the driver circuits 51 and 52 for in turn selectively powering the row and column electrodes 18 and 19 for selecting the appropriate pixels 20 to operate in the first light transmitting mode and in the second light scattering mode for forming the respective frames of data. Simultaneously with operating the driver circuits 51 and 52 the microcontroller 50 also under the control of the software operates the video projector 35 through the driver circuit 53 to project the light beam 37 defining the image 38 corresponding to the frame of data displayed on the visual display panel 5. The characters 39 in the frame of data, and the light beam 37 with the image 38 of the characters 39 of the frame of data are simultaneously displayed on the visual display panel 5 projected from the video projector 35 so that light from the light beam 37 projected by the video projector 35 is incident on the pixels 20*b* which are being operated in the second light scattering mode.

The pixels 20*b* operating in the second light scattering mode for forming the characters 39 of the frame of data appear particularly bright and vibrant due to the fact that light from the light beam 37 is projected onto the pixels 20*b* operating in the second light scattering mode, and thus, the pixels 20*b* operating in the second light scattering mode appear to a subject 33 to be significantly brighter than the pixels 20*a* being operated in the first light transmitting mode, and thus the contrast between the pixels 20*b* operating in the second light scattering mode and the pixels 20*a* operating in the first light transmitting mode is significantly enhanced.

It will be readily apparent to those skilled in the art that the frames of data being displayed on the visual display panel 5 and being projected by the video projector 35 may be any type of data, whether information in the form of words, letters, numerals and the like, or representations of people, places or articles. Furthermore, the frames of data may be displayed on the visual display panel 5 at an appropriate rate in order to animate the characters which are being displayed. Alternatively, the frames of data displayed may be static, in which case, the frames of data would be displayed for predetermined time periods, depending on how long it was desired to display each individual frame of data, and it will of course be appreciated that the duration for which different frames of data are displayed may vary from one frame to the other.

Figure 9:
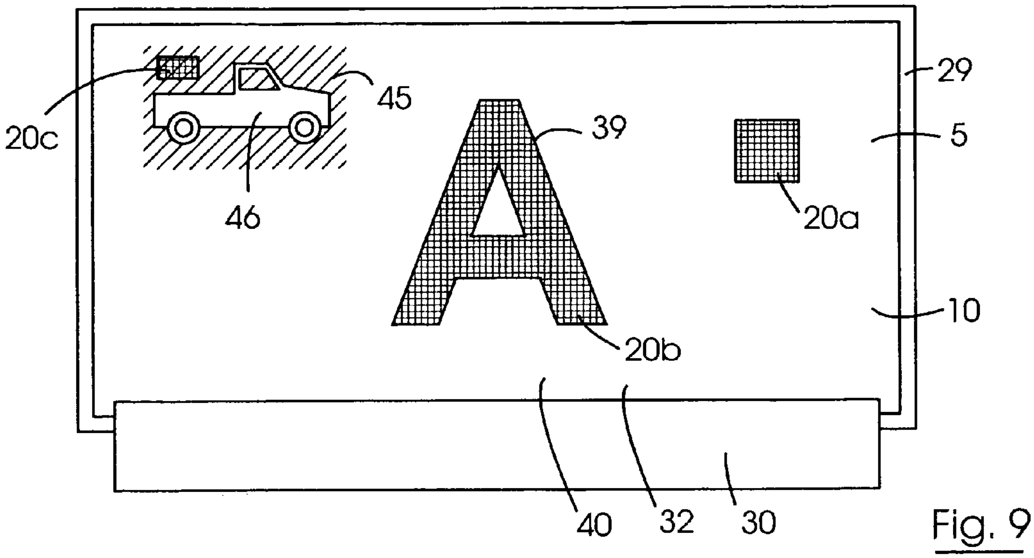
FIG. 9 is a front elevational view also of the visual display device of FIG. 1.

Referring now to FIG. 9, the visual display device 1 is illustrated with some of the pixels 20 being operated in the grey scale mode for forming a part 45 of the background 40. In this case the control circuit 26 operates the driver circuits 51 and 52 to apply a voltage intermediate the maximum voltage and zero volts to operate the pixels which are to be operated in the grey scale mode at the desired level of grey scale. The pixels operated in the grey scale mode to form the part 45 of the background 40 are identified as the pixels 20*c*. In this case, the video projector 35 is controlled by the control circuit 26 for projecting one or more additional images 46 onto the group of pixels 20*c* which are operating in the grey scale mode for forming the image 46 on the part 45 of the background 40. The additional image 46 may be any image, for example, additional data, or a graphic display, as for example is illustrated by the pick-up truck 46. Indeed, the additional image may be an animated or static graphical image or both, or indeed, an animated or static data image or both. The projected light of the additional image 46 is transmitted through those pixels 20*c* operating in the grey scale mode on which it is incident, thereby providing contrast between those pixels 20*c* operating in the grey scale mode on which the projected light forming the additional image 46 is incident, and those pixels 20*c* operating in the grey scale mode on which no additional projected light is incident.

Figure 10:
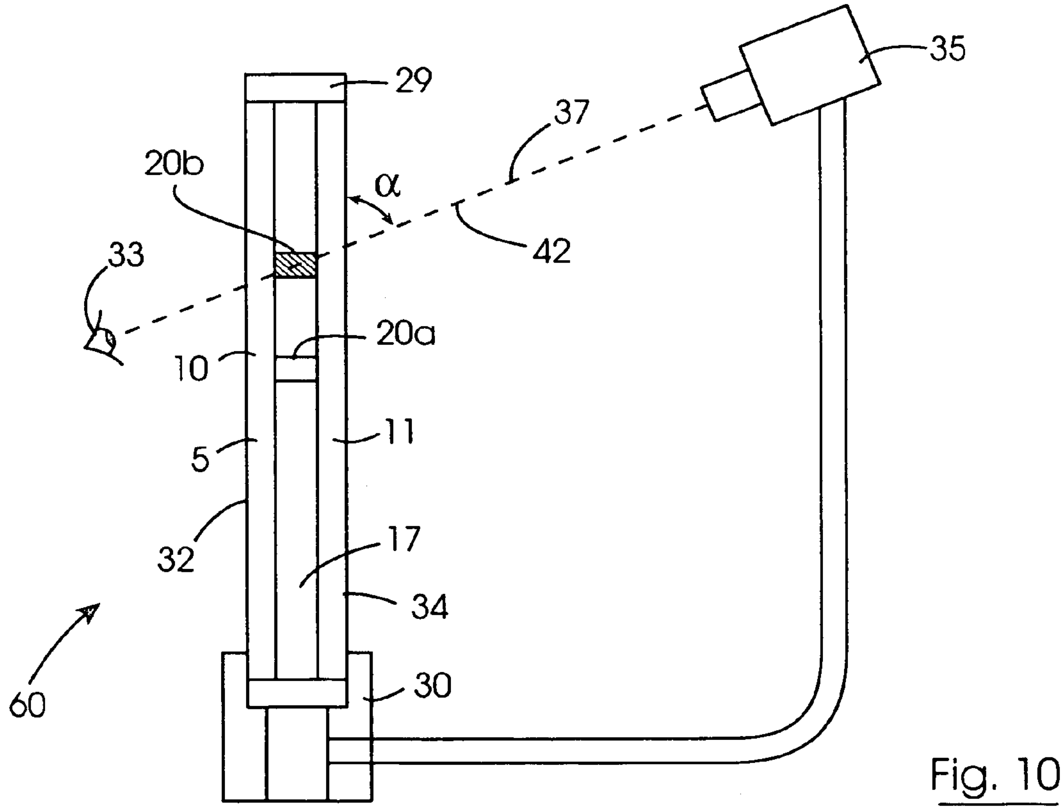
FIG. 10 is a view similar to FIG. 3 of a visual display device according to another embodiment of the invention.

Referring now to FIG. 10, there is illustrated a visual display device according to another embodiment of the invention indicated generally by the reference numeral 60. The visual display device 60 is substantially similar to the visual display device 1 and similar components are identified by the same reference numerals. The main difference between the visual display device 60 and the visual display device 1 is that the video projector 35 projects the light beam 37 downwardly at an angle $\alpha$ to the rear major face 34 of the visual display panel 5. The advantage of directing the light beam downwardly at an angle $\alpha$ to the visual display panel 5 is that no light is transmitted directly through the pixels which are operating in the second light scattering mode. If the panel was located at a height where a subject would be effectively in line with the axis of the light beam, and the axis of the light beam was contained in the X and Y planes, some light would be transmitted through the pixels directly without being scattered, and this would tend to dazzle or blind a subject. Thus, by directing the light at an angle $\alpha$ to the rear major face of the panel, no direct light from the light beam passes directly through the pixels, thus avoiding any blinding or dazzling effects. The angle $\alpha$ at which the light beam is directed to the panel may to some extent be determined by the level of the grey scale mode at which the pixels are being operated, in other words, whether a high proportion of incident light is being scattered or otherwise, and also by the height at which the visual display will be located relative to people viewing the panel. However, in general, it is envisaged that the angle $\alpha$ at which the light beam will be projected to the light beam will be in the range of 50° to 80°, and generally the angle $\alpha$ will be in the order of 64°. However, in general, it is envisaged that the light beam will be projected in a vertical plane, namely, in a vertical Y plane extending perpendicularly from the rear major surface of the visual display panel, and thus, the axis of the light beam will be contained in the vertical Y plane at the angle $\alpha$ in the order of 64° to the rear major face 34. Otherwise, the video display device 60 is similar to the video display device 1 and its use and operation is likewise similar.

Figure 11:
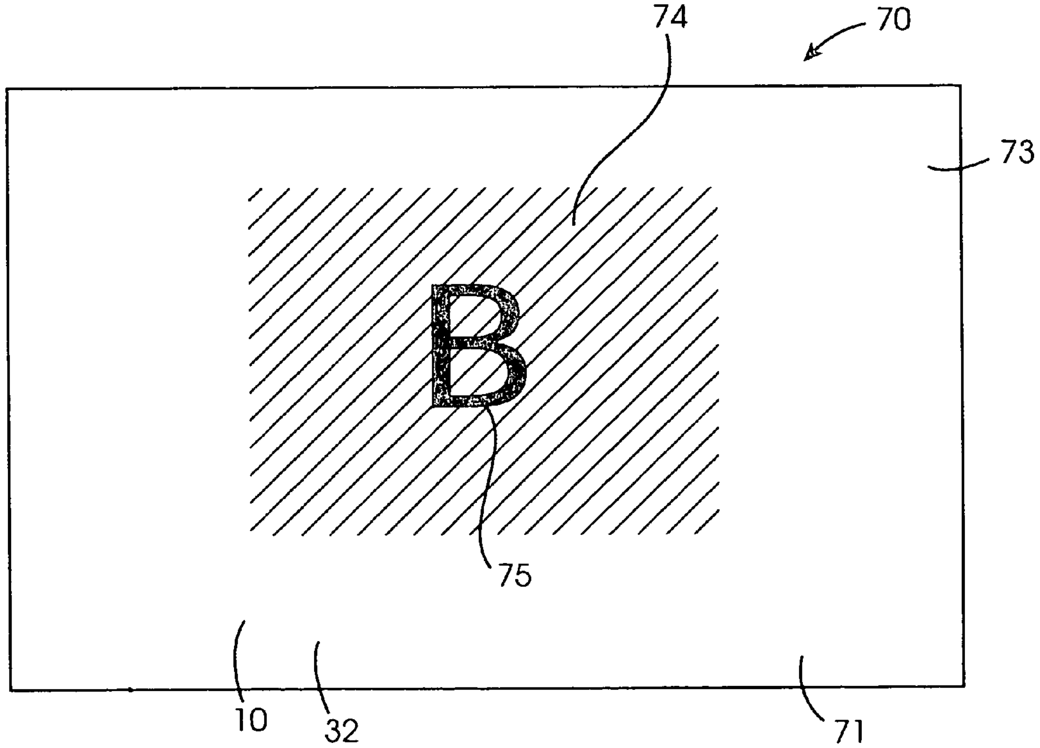
FIG. 11 is a front elevational view of a visual display device according to a further embodiment of the invention.

Referring now to FIG. 11 there is illustrated a visual display device according to another embodiment of the invention indicated generally by the reference numeral 70. The visual display device 70 is substantially similar to the visual display device 1 and similar components are identified by the same reference numerals. The visual display device 70 comprises a visual display panel 71 which is substantially similar to the visual display panel 5. Additionally, the visual display device 70 comprises a video projector which is not shown but is similar to the video projector 35 and is located to the rear of the visual display panel 71 for directing a light beam onto the rear major face of the visual display panel 71 in similar fashion as the video projector 35 projects the light beam onto the visual display panel 5 of the visual display device 1. A control circuit (not shown) but similar to the control circuit 26 controls the operation of the visual display panel 71 and the video projector (not shown) so that the data displayed on the visual display panel 71 and the image projected in the video projector beam are synchronised and aligned with each other.

In this embodiment of the invention the cholesteric liquid crystal medium is operable in a third light scattering mode, whereby some of the light incident on one side of the pixels 20 is transmitted through the pixels and scattered as it is being transmitted through the pixels, and the rest of the light incident on the pixels is reflected. Additionally, the driver circuits 51 and 52 are operable under the control of the microcontroller 50 for selectively varying the voltage applied across the pixels 20 by the electrodes 18 and 19 for selectively operating the pixels 20 in the third light scattering mode as well as in the second light scattering mode, and in the first light transmitting mode. The pixels are operated in the third light scattering mode by applying a voltage across the pixels which lies between the voltage for operating the pixels in the first light transmitting mode and zero volts. The video projector is operated for projecting light at the pixels operating in both the second and the third light scattering modes. When operating in the first light transmitting mode and the second light scattering mode the pixels of the visual display panel 71 operate in similar fashion as those of the visual display panel 5 of the visual display device 1. However, in the third light scattering mode, since the pixels operate to permit only a proportion of the projected light from the video projector to pass through the pixels, only that proportion of light which passes through a pixel 20 operating in the third light scattering mode is scattered towards the subject. The remainder of the projected light is reflected from the rear major face of the pixel. However, additionally, those pixels 20 which are operating in the third light scattering mode also reflect a proportion of incident ambient light which is incident on the front major face of the pixel.

Accordingly, where the visual display device 70 is mounted with the visual display panel 71 in a shop window, a subject viewing the visual display panel 71 from the front face thereof is presented with both scattered light and reflected ambient light from the pixels which are operating in the third light scattering mode. In other words, the subject is presented with the proportion of the scattered projected light which is passed through the pixels 20 from the video projector, and a proportion of reflected ambient light which may be sunlight, daylight or artificial light, as the case may be, reflected from the front face of the pixels 20 operating in the third light scattering mode.

Accordingly, the visual display device 70 provides a visual display panel 71 in which pixels 20 can be operated in the first light transmitting mode for forming a general background to the display on the visual display panel 71, as for example the background 73. Other pixels 20 can be operated in the third light scattering mode for forming an intermediate background, as for example, the intermediate background 74, while the remaining pixels 20 can be operated in the second light scattering mode for forming characters 75 for forming the information to be displayed.

Needless to say, the characters formed by the pixels operating in the second light scattering mode may be letters, numerals, images of people, places, cartoon characters, articles or the like, which may be static or animated. The video projector may be operated for projecting light of the same intensity over the entire area formed by the pixels operating in the second and third light scattering mode, or the video projector may be operated for projecting light of different intensities and/or colours towards the pixels operating in the respective second and third light scattering modes for further enhancing the contrast between the pixels operating in the respective second and third light scattering modes.

It will be appreciated that the panel described with reference to FIG. 11 may be pre-treated so that the pixels when operating in the third light scattering mode reflect light of one colour only of the colours of the white light spectrum.

While the panel described with reference to FIG. 11 has been described as having the intermediate background formed by the pixels operating in the third light scattering mode, it will be appreciated that the intermediate background may be formed by the pixels operating in the second light scattering mode and the characters forming the information could be formed by the pixels operating in the third light scattering mode. Indeed, it will be appreciated that the pixels may be selected in any other combination to form the background, intermediate background and the characters, for example in certain cases it is envisaged that the characters may be formed by the pixels operating in the first light transmitting mode and the background and intermediate background may be formed by the pixels operating in the second light scattering mode and the third light scattering mode, respectively, or vice versa. Similarly, the pixels may be operated in reverse in the case of the visual display panel 5 of the device 1, whereby the characters would be formed by the pixels operated in the first light transmitting mode and the background would be formed by the pixels operated in the second light scattering mode. In general it is preferable that the projected light should be incident on the pixels operating in the second light scattering mode. It will also be appreciated that some of the pixels in the panel of FIG. 11 could be operated in the grey scale mode to form either the background or the intermediate background or indeed, the characters.

While the visual display devices have been described as comprising a single video projector, it is envisaged that two or more video projectors may be provided for directing light beams onto the rear face of the visual display panel. The video projectors may be arranged so that each projector projects onto a separate specific area of the visual display panel, or they may be arranged that some or all of the video projectors project onto the entire visual display panel. This, thus, would facilitate the projecting of multiple additional images onto the visual display panel. It is an advantage to arrange the projector or projectors to project a number of different colours simultaneously onto the visual display panel, although, it will be appreciated that a single video projector could be provided which would itself project a number of different colours of light onto the visual display panel. Needless to say, other suitable light projecting means besides a video projector may be used for projecting a light beam defining an image of the character or characters onto the visual display panel, and such other light projecting means could also be arranged to project a number of colours simultaneously or sequentially.

In general, it is envisaged that a relatively high light intensity of projected light from the video projector will be required in order to distinguish the light projected onto the rear face of the visual display panel from background lighting in the area in which the device is located. This would be particularly so in cases where coloured light was being projected from the video projector onto the rear face of the visual display panel in order that the coloured light would not be washed out from the pixels 20*b* operating in the second light scattering mode by the background light in the area in which the visual display device is located.

It is also envisaged that the characters may be formed by operating the pixels in the grey scale mode, and this may improve the quality of the display. However, although the quality of the display may be improved, a slight disadvantage would result from the fact that the viewing angle of the light being scattered by the pixels operating in the grey scale mode would be narrower, and thus, in certain cases may not fall within the field of view of a subject. This disadvantage is caused by the fact that the pixels operating in the intermediate grey scale mode would emit light of narrower cone angle than the cone angle of light emitted by the pixels when operating in the full light scattering mode. It is particularly advantageous to operate the pixels in the intermediate grey scale mode in areas of the display where additional images are to be projected by the video projector, since by virtue of the fact that the cone angle of the pixels operating in the intermediate grey scale mode is narrower than those operating in the full second light scattering mode, the scattered light emitted by the pixels operating in the intermediate grey scale mode appears brighter to a subject, and thus the additional image projected by the video projector appears brighter to a subject. It is also envisaged that the level of intermediate grey scale mode may be altered.

While in the embodiment of the invention described with reference to FIGS. 1 to 9 the characters, in general, have been described as being formed by the pixels which are operated in the second light scattering mode, and the background has been formed by pixels operating in the first light transmitting mode, the reverse could equally apply, and in which case, the characters would be formed by the pixels operating in the light transmitting mode, while the background would be formed by the pixels operating in the light scattering mode.

While the visual display device which has been described with reference to FIGS. 1 to 9 has been described with the visual display panel laminated to a window pane, it will be appreciated that where the window is provided as a double glazed window, the visual display panel could be located within the respective window panes forming the double glazing. Needless to say, the visual display devices according to the invention may be stand alone devices.

It is also envisaged that the characters may be simultaneously displayed in different colours, and the colours could be varied from one colour to the next. Additionally, it is envisaged that the means for projecting the light may be operated so that bands of colours are strobed through the characters.

While the means for projecting the light has been described as being a video projector, any other suitable light projecting means may be provided.

It is also envisaged that the additional image may be projected onto the character or a part thereof.

What is claimed is:

1. A method for operating a visual display panel for displaying a character, the visual display panel being of the type comprising a plurality of individually addressable pixels, the pixels being alternately and selectively operable in a first light transmitting mode and in a second light scattering mode, characterised in that the pixels are alternately and selectively operable in one of the first light transmitting mode and the second light scattering mode for forming a background, and in the other of the first light transmitting mode and the second light scattering mode for defining the character against the background, the visual display panel having a front major face from which the character is viewable, and an opposite rear major face, the method comprising projecting light onto the rear major face of the panel from the rear thereof, so that the projected light only falls on the pixels which are being operated in one of the first light transmitting mode and the second light scattering mode for enhancing the contrast between the pixels operating in the respective first light transmitting mode and the second light scattering mode.

2. A method as claimed in claim 1 characterised in that the light is projected onto the pixels which are being operated in the second light scattering mode so that the projected light is scattered towards the subject, and preferably, the pixels are operated in the first light transmitting mode for forming the background.

3. A method as claimed in claim 1 characterised in that the projected light is projected in the form of a light beam, and preferably, the light beam defines an image of the character, and advantageously, the light beam is projected so that the image of the character defined by the light beam when projected onto the rear major face of the panel is aligned with the character displayed on the panel.

4. A method as claimed in claim 3 characterised in that the light beam is projected from a video projector, and preferably, the light beam being projected by the video projector is synchronised with the visual display panel, and advantageously, the light beam is derived from at least one of a plurality of selectable colours, and preferably, at least some of the selectable colours are simultaneously selectable, and advantageously, at least some of the selectable colours are sequentially selectable.

5. A method as claimed in claim 1 characterised in that the light is projected onto the rear major face of the panel along an axis contained in at least one of an X plane and a Y plane perpendicular to each other, the respective X and Y planes extending perpendicularly from the rear major face of the panel, and preferably, the axis along which the light is projected onto the rear major face of the panel extends at an angle in the range of 50° to 80° to the rear major face of the panel in the one of the X and Y planes within which the axis is contained, and advantageously, the axis along which the light is projected onto the rear major face of the panel extends at an angle in the range of 59° to 69° to the rear major face of the panel in the one of the X and Y planes within which the axis is contained, and preferably, the axis along which the light is projected onto the rear major face of the panel extends at an angle of 64° approximately to the rear major face of the panel in the one of the X and Y planes within which the axis is contained, and advantageously, the axis along which light is projected onto the rear major face of the visual display panel is contained in both the X plane and the Y plane.

6. A method as claimed in claim 1 characterised in that the pixels are selectively operable in a third light scattering mode in which only a proportion of light incident on each pixel operating in the third light scattering mode is passed through the pixel and scattered therefrom, the remainder of the light incident on the pixel being reflected, and preferably, when each pixel is operated in the third light scattering mode, some of the ambient light incident on the pixel on the front face thereof is reflected from the front face of the pixel, so that a subject viewing the panel from the front face thereof is presented with both scattered projected light which has been passed through the pixel operating in the third light scattering mode, and ambient light reflected from the front face of the pixel operating in the third light scattering mode, and advantageously, the proportion of light scattered by each pixel operating in the third light scattering mode lies in the range of 20% to 80% of the incident light, and the proportion of light reflected from each pixel operating in the third light scattering mode lies in the range of 20% to 80% of the incident light thereon.

7. A method as claimed in claim 1 characterised in that the pixels are selectively operable in an intermediate grey scale mode whereby some of the light incident on each pixel operating in the grey scale mode is transmitted through the pixel unscattered and some of the light incident on the pixel is transmitted through the pixel but is scattered, and preferably, some of the background is formed by pixels operating in the grey scale mode.

8. A method as claimed in claim 1 characterised in that the light projected onto the rear major face defines an additional image, and preferably, the additional image defined by the projected light is projected onto the pixels which are being operated for forming the background, and advantageously, the additional image is selectively alterable, and preferably, the additional image is a static image, and advantageously, at least part of the additional image comprises an animated character, and preferably, the additional image is partly static and partly animated, and advantageously, the additional image includes letters for forming information to be displayed in the additional image, and preferably, the additional image contains numerals for forming information to be displayed in the additional image, and advantageously, the additional image comprises a combination of letters and numerals for forming information to be displayed in the additional image, and preferably, the additional image includes characters which are selectable from any one or more of the following:

people,
places,
cartoon characters, and
articles.

9. A method as claimed in claim 1 characterised in that the displayed characters are selectively alterable, and preferably, at least some of the characters displayed on the visual display panel are static characters, and advantageously, at least some of the characters displayed on the visual display panel are animated characters, and preferably, the characters displayed on the visual display panel are static characters and animated characters, and advantageously, some of the characters displayed on the visual display panel are letters for forming information to be displayed on the panel, and preferably, some of the characters displayed on the visual display panel are numerals for forming information to be displayed on the panel, and advantageously, some of the characters displayed on the visual display panel are a combination of letters and numerals for forming information to be displayed on the panel, and preferably, some of the characters displayed on the visual display panel are an image selected from one or more of the following:

people,
places,
cartoon characters, and
articles.

10. A visual display device for displaying a character, the visual display device comprising a visual display panel of the type comprising a plurality of individually addressable pixels, the pixels being alternately and selectively operable in a first light transmitting mode and in a second light scattering mode, characterised in that the pixels are alternately and selectively operable in one of the first light transmitting mode and in the second light scattering mode for forming a background, and in the other of the first light transmitting mode and the second light scattering mode for defining the character against the background, the panel having a front major face from which the character is viewable, and an opposite rear major face, and a light projecting means is provided for projecting light onto the rear major face of the panel from the rear thereof, the light projecting means projecting the light so that light only falls on the pixels which are being operated in one of the first light transmitting mode and the second light scattering mode for enhancing the contrast between the pixels operating in the respective first light transmitting mode and the second light scattering mode.

11. A visual display device as claimed in claim 10 characterised in that the light projecting means is operable for projecting the light onto the pixels which are operating in the second light scattering mode so that the projected light is scattered towards the subject, and preferably, the pixels are operated in the first light transmitting mode for forming the background.

12. A visual display device as claimed in claim 10 characterised in that the light projecting means is operable for projecting the light in the form of a light beam, and preferably, an image of the character is defined by the light beam, and advantageously, the light projecting means is mounted relative to the visual display panel so that the image of the character defined by the light beam is aligned with the character displayed on the visual display panel.

13. A visual display device as claimed in claim 10 characterised in that the light projecting means is a video projector, and preferably, the light projecting means projects light derived from at least one of a plurality of selectable colours, and advantageously, at least some of the plurality of colours are simultaneously selectable, and preferably, at least some of the plurality of colours are sequentially selectable for projecting in the light beam, and advantageously, the light projecting means is synchronised with the visual display panel, and preferably, a control means is provided for controlling the operation of the visual display panel and the light projecting means.

14. A visual display device as claimed in claim 10 characterised in that the light projecting means is mounted relative to the visual display panel so that the light projected onto the rear major face of the panel is projected along an axis which is contained in at least one of an X plane and a Y plane perpendicular to each other, the respective X and Y planes extending perpendicularly from the rear major face of the visual display panel, and preferably, the light projecting means is mounted relative to the visual display panel so that the axis along which the light is projected in the one of the X plane and the Y plane which contains the axis is at an angle to the rear major face of the visual display panel which lies in the range of 50° to 80°, and advantageously, the light projecting means is mounted relative to the visual display panel so that the axis along which the light is projected in the one of the X plane and the Y plane which contains the axis is at an angle to the rear major face of the visual display panel which lies in the range of 59° to 69°, and preferably, the light projecting means is mounted relative to the visual display panel so that the axis along which the light is projected in the one of the X plane and the Y plane which contains the axis is at an angle to the rear major face of the visual display panel of 64° approximately, and advantageously, the light projecting means is mounted relative to the visual display panel so that the axis along which the light is projected onto the rear major face of the visual display panel is contained in the X plane and the Y plane.

15. A visual display device as claimed in claim 10 characterised in that the pixels are selectively operable in a third light scattering mode in which only a portion of the light incident on each pixel operated in the third light scattering mode is passed through the pixel and scattered, the remainder of the light incident on the pixel operating in the third light scattering mode being reflected, and preferably, a proportion of ambient light incident on each pixel operating in the third light scattering mode is reflected from the front face thereof, so that a subject viewing the visual display panel from the front major face thereof is presented with scattered projected light which has passed through each pixel operating in the third light scattering mode and ambient light reflected from the pixel operating in the third light scattering mode from the front face thereof, and advantageously, the proportion of light scattered by each pixel operating in the third light scattering mode lies in the range of 20% to 80% of the incident light thereon, and preferably, the portion of light reflected by each pixel operating in the third light scattering mode lies in the range of 20% to 80% of the incident light thereon.

16. A visual display device as claimed in claim 10 characterised in that the pixels are selectively operable in an intermediate grey scale mode, whereby some of the light incident on each pixel operating in the grey scale mode is transmitted through the pixel unscattered and some of the light incident on the pixel is transmitted through the pixel but is scattered, and preferably, some of the background is formed by pixels operating in the grey scale mode.

17. A visual display device as claimed in claim 10 characterised in that the light projecting means is adapted for projecting an additional image onto the rear major face of the visual display panel, and preferably, the additional image projected by the light projecting means is projected onto the pixels which are being operated for forming the background, and preferably, the additional image is selectively alterable, and advantageously, the additional image is a static image, and preferably, at least part of the additional image comprises an animated character, and advantageously, the additional image is partly static and partly animated, and preferably, the additional image includes letters for forming information to be displayed in the additional image, and advantageously, the additional image contains numerals for forming information to be displayed in the additional image, and preferably, the additional image comprises a combination of letters and numerals for forming information to be displayed in the additional image, and advantageously, the additional image includes characters which are selectable from any one or more of the following:

people, places, cartoon characters, and articles.

18. A visual display device as claimed in claim 10 characterised in that the pixels are arranged in a plurality of rows and columns to form a matrix.

19. A visual display device as claimed in claim 10 characterised in that the visual display panel comprises a front substrate panel and a rear substrate panel defining the front and rear major faces, respectively, of the visual display panel, and an electro-optical medium sandwiched between the respective front and rear substrate panels, and preferably, the electro-optical medium is a cholesteric liquid crystal medium, and advantageously, one of the front and rear substrate panels is patterned with a plurality of electrically conductive column electrodes, and the other of the front and rear substrate panels is patterned with a plurality of row electrodes for cooperating with the column electrodes for defining the respective pixels, and preferably, the respective row and column electrodes are addressable by the control means for selectively addressing the corresponding pixels for operating the pixels in a selected one of the selectable modes.

20. A visual display device as claimed in claim 10 characterised in that the displayed characters displayed on the visual display panel are selectively alterable, and preferably, at least some of the characters displayed on the visual display panel are static characters, and advantageously, at least some of the characters displayed on the visual display panel are animated characters, and preferably, at least some of the characters displayed on the visual display panel are a combination of animated and static characters.

21. A visual display device as claimed in claim 10 characterised in that the visual display panel is adapted for mounting in a shop window, and preferably, the visual display panel is adapted for mounting in a shop window with the visual display panel laminated thereto, and advantageously, the visual display panel is adapted for mounting in a shop window with a part of the window of the shop window being formed by the visual display panel.

22. A shop window comprising a window pane, and the visual display device as claimed in claim 10 mounted adjacent the window pane, and preferably, the visual display device is laminated to the window pane, and advantageously, the visual display device forms a part of the window pane.

* * * * *

UNITED STATES PATENT AND TRADEMARK OFFICE

CERTIFICATE OF CORRECTION

PATENT NO. : 7,080,784 B2
APPLICATION NO. : 10/487921
DATED : July 25, 2006
INVENTOR(S) : Donal O'Keeffe It is certified that error appears in the above-identified patent and that said Letters Patent is hereby corrected as shown below:

Title page item (73) should read Vlyte Innovations Limited, Limerick, ~~(IR)~~(IE).

Signed and Sealed this

Thirteenth Day of May, 2008

JON W. DUDAS
*Director of the United States Patent and Trademark Office*